United States Patent
Thomassin

(10) Patent No.: US 9,200,563 B2
(45) Date of Patent: Dec. 1, 2015

(54) INTERNAL COMBUSTION ENGINE WITH COMMON RAIL PILOT AND MAIN INJECTION

(71) Applicant: Pratt & Whitney Canada Corp., Longueuil (CA)

(72) Inventor: Jean Thomassin, Ste-Julie (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 168 days.

(21) Appl. No.: 13/796,239

(22) Filed: Mar. 12, 2013

(65) Prior Publication Data
US 2014/0261294 A1   Sep. 18, 2014

(51) Int. Cl.
| F02B 53/10 | (2006.01) |
| F02B 19/00 | (2006.01) |
| F01C 1/22  | (2006.01) |
| F02B 19/10 | (2006.01) |
| F02D 41/30 | (2006.01) |
| F02D 41/38 | (2006.01) |
| F02B 55/14 | (2006.01) |

(52) U.S. Cl.
CPC . *F02B 53/10* (2013.01); *F01C 1/22* (2013.01); *F02B 19/108* (2013.01); *F02D 41/3094* (2013.01); *F02D 41/3836* (2013.01); *F02B 55/14* (2013.01); *F02B 2275/32* (2013.01); *Y02T 10/125* (2013.01); *Y02T 10/142* (2013.01)

(58) Field of Classification Search
CPC .......... F02B 53/10; F02B 19/108; F01C 1/22; F02D 41/3098
USPC .................................. 123/209, 261, 205–206
See application file for complete search history.

(56) References Cited

U.S. PATENT DOCUMENTS

| 3,894,518 | A | * | 7/1975  | Gavrun et al. .................. 123/206 |
| 3,958,538 | A | * | 5/1976  | Hoshino ......................... 123/209 |
| 3,960,115 | A | * | 6/1976  | Lamping et al. ............... 123/206 |
| 3,987,759 | A | * | 10/1976 | Roberts et al. ................. 123/206 |
| 4,029,058 | A | * | 6/1977  | Jones ............................... 123/205 |
| 4,070,995 | A | * | 1/1978  | Loyd, Jr. ......................... 123/205 |
| 4,083,329 | A | * | 4/1978  | Myers ............................ 123/205 |
| 4,085,712 | A | * | 4/1978  | Myers et al. ................... 123/205 |
| 4,091,789 | A | * | 5/1978  | Jones ............................. 123/205 |
| 4,681,073 | A | * | 7/1987  | Poore ............................. 123/206 |
| 5,313,924 | A |   | 5/1994  | Regueiro |
| 6,302,080 | B1 |  | 10/2001 | Kato et al. |
| 6,374,800 | B2 |  | 4/2002  | Saiki |
| 6,568,369 | B1 |  | 5/2003  | Desai et al. |

(Continued)

FOREIGN PATENT DOCUMENTS

| EP | 2551448    | 1/2013 |
| EP | 2623710    | 8/2013 |
| WO | 2012089371 | 7/2012 |

*Primary Examiner* — Thai Ba Trieu
*Assistant Examiner* — Ngoc T Nguyen
(74) *Attorney, Agent, or Firm* — Norton Rose Fulbright Canada

(57) ABSTRACT

An internal combustion engine including a pilot subchamber, a pilot fuel injector having a tip in communication with the pilot subchamber, an ignition element positioned to ignite fuel within the pilot subchamber, and a main fuel injector spaced apart from the pilot fuel injector. The engine includes a common rail in fluid communication with the main fuel injector and with the pilot fuel injector and a pressure regulating mechanism in fluid communication with the common rail for regulating a fuel pressure therein. A method of combusting fuel in an internal combustion engine is also provided.

20 Claims, 4 Drawing Sheets

(56) References Cited

U.S. PATENT DOCUMENTS

| | | | |
|---|---|---|---|
| 7,219,655 B2* | 5/2007 | Shinogle | 123/456 |
| 7,392,491 B2 | 6/2008 | Ismailov | |
| 7,522,987 B2* | 4/2009 | Fujii | 123/486 |
| 2008/0306648 A1* | 12/2008 | Takahashi | 701/29 |
| 2013/0025567 A1* | 1/2013 | Thomassin et al. | 123/209 |
| 2014/0245988 A1* | 9/2014 | Villeneuve et al. | 123/208 |
| 2014/0251258 A1* | 9/2014 | Thomassin et al. | 123/254 |

* cited by examiner

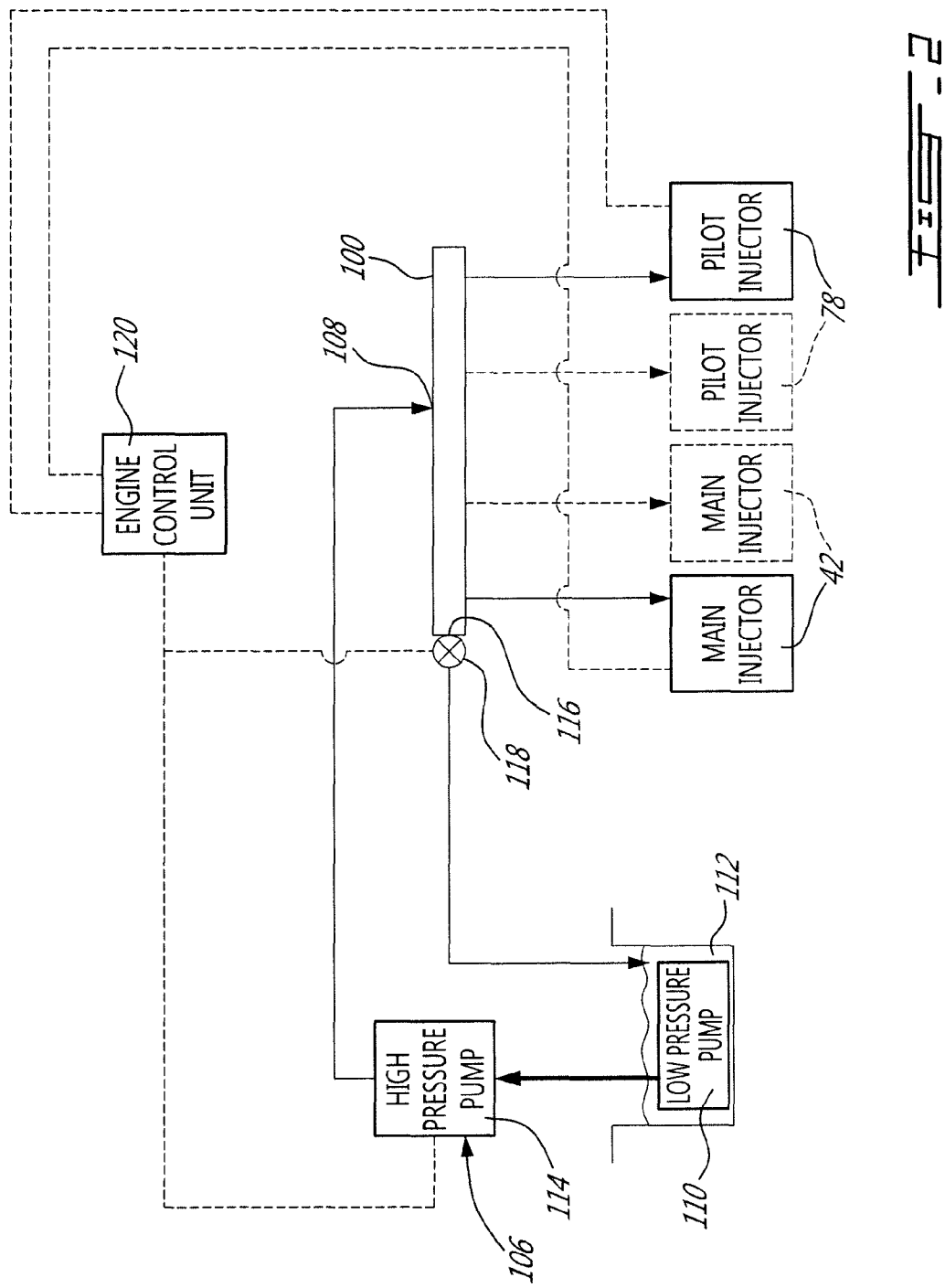

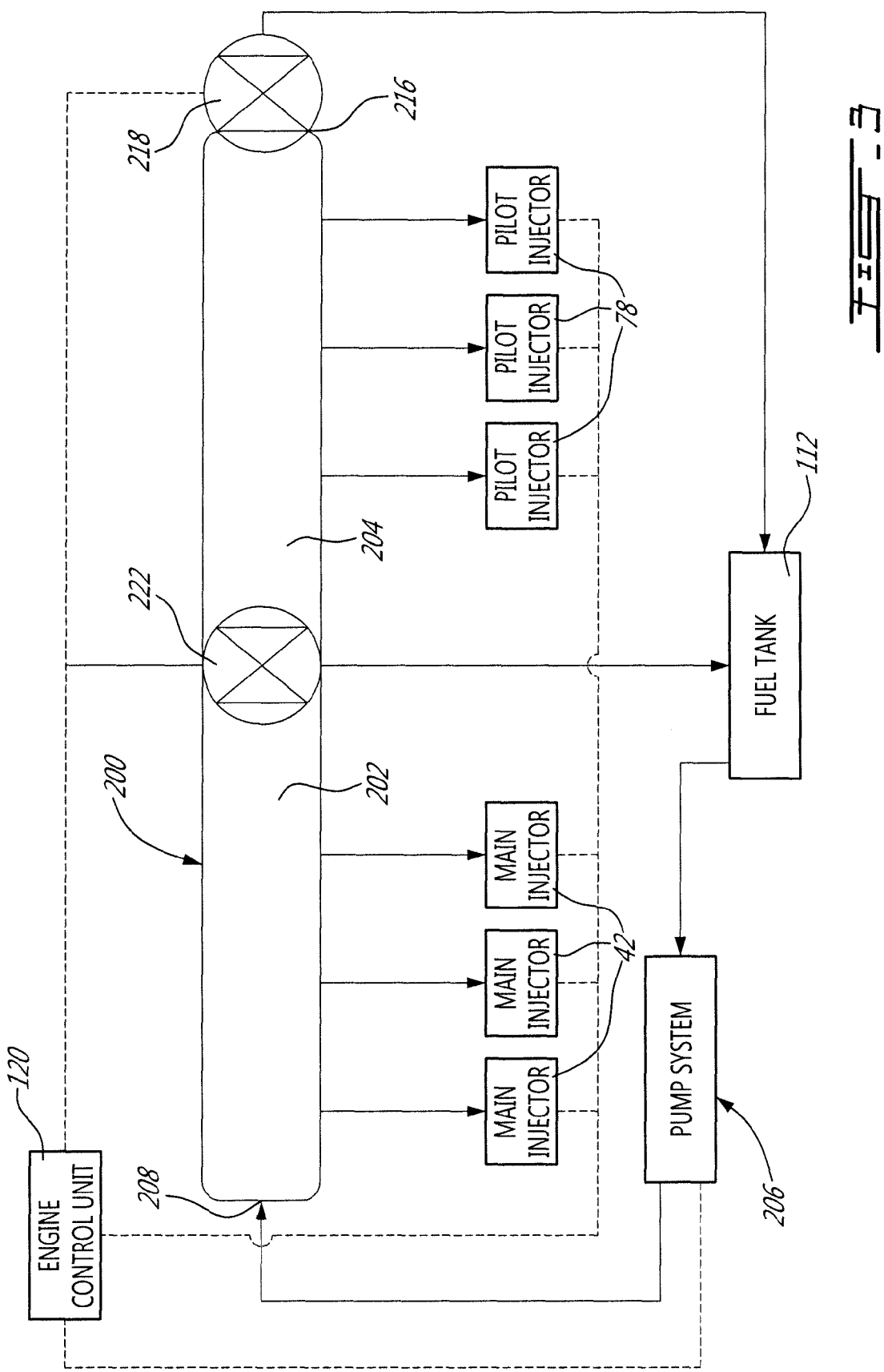

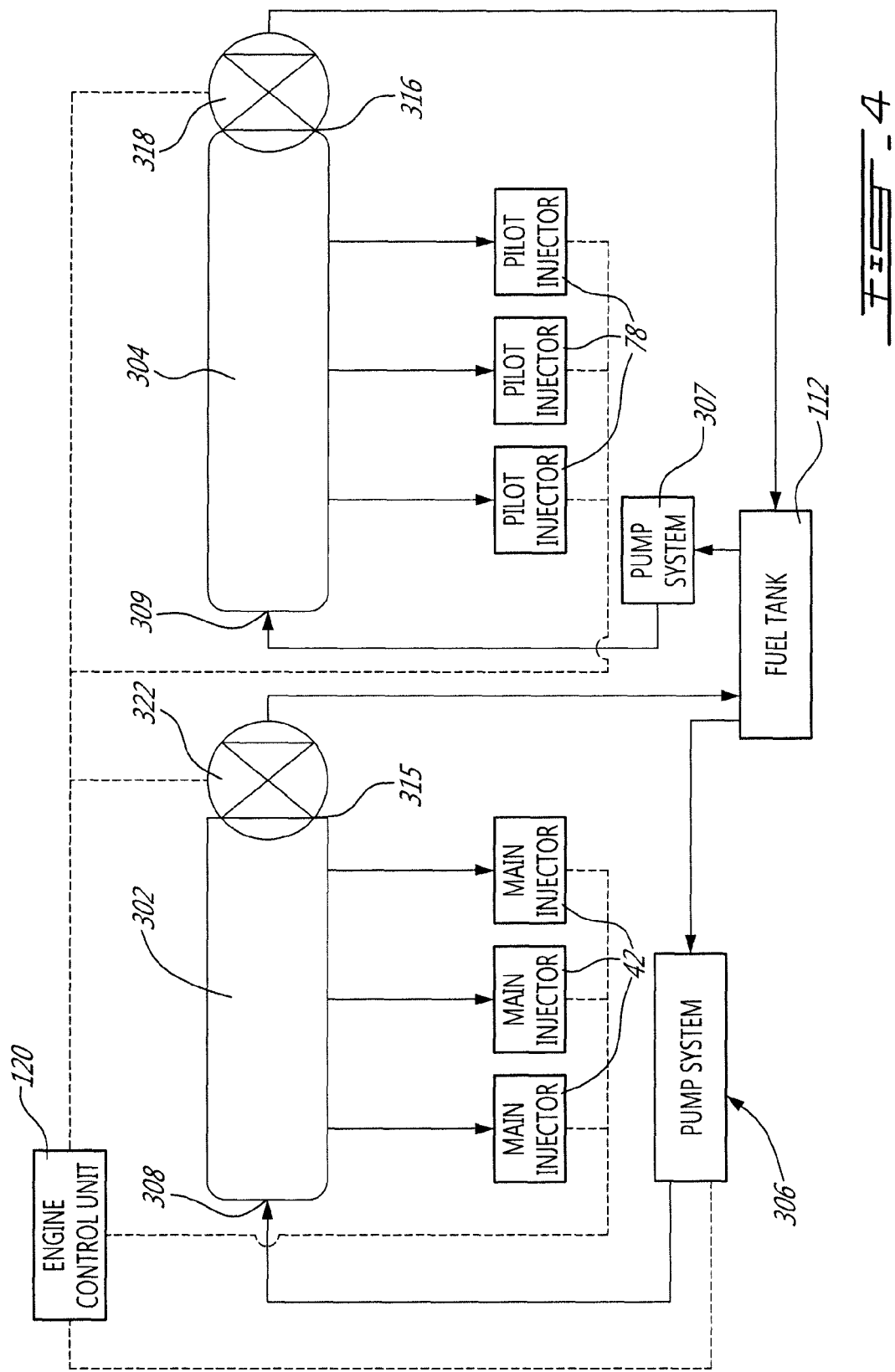

INTERNAL COMBUSTION ENGINE WITH COMMON RAIL PILOT AND MAIN INJECTION

TECHNICAL FIELD

The application relates generally to internal combustion engines and, more particularly, to pilot and main fuel injection in such engines.

BACKGROUND OF THE ART

Some reciprocating internal combustion engines have a main and pilot fuel injection performed by a same fuel injector. The fuel injectors may be fed by a common rail, where for example each injector includes a pressure intensification mechanism to perform the main injection at an increased pressure and performs a pilot injection using the common rail pressure. Accordingly, a relatively complex configuration may be required for each injector.

Some internal combustion engines, including some rotary engines, include a pilot subchamber for pilot ignition. However, known arrangements are not optimized, in terms of combustion arrangements and characteristics, and thus room for improvement exists.

SUMMARY

In one aspect, there is provided an internal combustion engine comprising: an outer body defining an internal cavity; a rotatable body sealingly and rotationally received within the internal cavity to define at least one combustion chamber of variable volume; a pilot subchamber defined in the outer body in communication with the internal cavity; a pilot fuel injector having a tip in communication with the pilot subchamber; an ignition element positioned to ignite fuel within the pilot subchamber; a main fuel injector spaced apart from the pilot fuel injector and having a tip in communication with the internal cavity at a location spaced apart from the pilot subchamber; a common rail in fluid communication with the main fuel injector and with the pilot fuel injector; and a pressure regulating mechanism in fluid communication with the common rail for regulating a fuel pressure therein.

In another aspect, there is provided a rotary internal combustion engine comprising: an outer body having an internal cavity defined by two axially spaced apart end walls and a peripheral wall extending between the end walls; a rotor body rotatable within the internal cavity in sealing engagement with the peripheral and end walls and defining at least one chamber of variable volume in the internal cavity around the rotor body; a pilot subchamber defined in the outer body in fluid communication with the internal cavity; a pilot fuel injector having a tip in communication with the pilot subchamber; an ignition element positioned to ignite fuel within the pilot subchamber; a main fuel injector spaced apart from the pilot fuel injector, the main fuel injector having a tip in communication with the internal cavity at a location spaced apart from the pilot subchamber; a common rail in fluid communication with the main fuel injector and with the pilot fuel injector; and a pressure regulating mechanism in fluid communication with the common rail for regulating a fuel pressure therein.

In a further aspect, there is provided a method of combusting fuel in an internal combustion engine having a rotatable body defining at least one combustion chamber, the method comprising: pressurizing the fuel in a common rail; feeding a pilot injector with the common rail to inject fuel in a pilot subchamber; igniting the fuel within the pilot subchamber; circulating the ignited fuel out of the pilot subchamber and into one of the at least one combustion chamber; and feeding a main injector separate from the pilot injector with the common rail to inject fuel into the one of at least one combustion chamber spaced apart from the pilot subchamber and the pilot injector.

DESCRIPTION OF THE DRAWINGS

Reference is now made to the accompanying figures in which:

FIG. 2 is a schematic view of an injection system which can be used with an internal combustion engine such as shown in FIG. 1, in accordance with a particular embodiment;

FIG. 3 is a schematic view of an injection system which can be used with an internal combustion engine such as shown in FIG. 1, in accordance with another particular embodiment; and FIG. 4 is a schematic view of an injection system which can be used with an internal combustion engine such as shown in FIG. 1, in accordance with a further particular embodiment.

DETAILED DESCRIPTION

Figure 1:
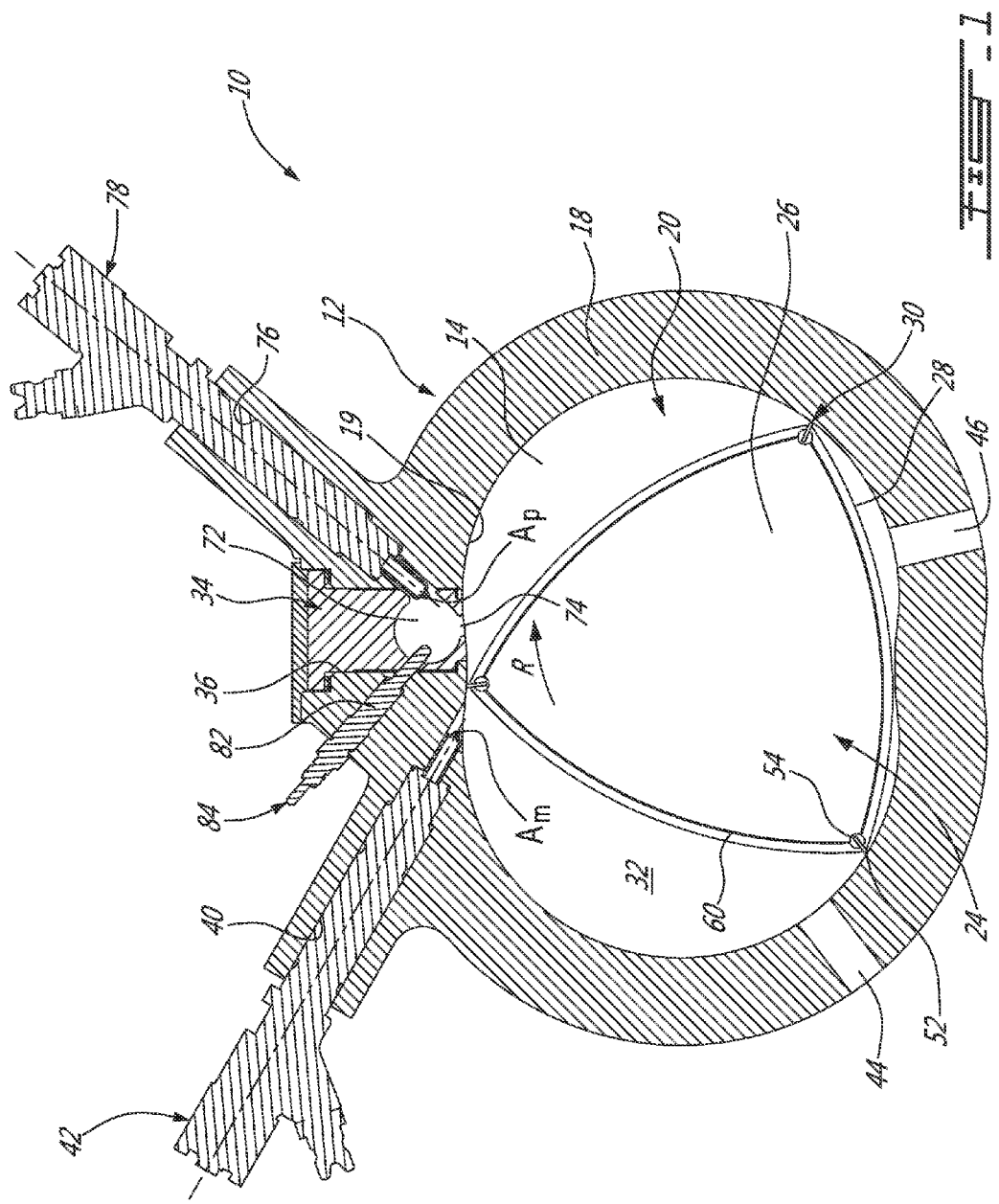
FIG. 1 is a schematic cross-sectional view of a rotary internal combustion engine in accordance with a particular embodiment.

Referring to FIG. 1, a rotary internal combustion engine 10 known as a Wankel engine is schematically shown. In a particular embodiment, the rotary engine 10 is used in a compound cycle engine system such as described in Lents et al.'s U.S. Pat. No. 7,753,036 issued Jul. 13, 2010, as described in Julien et al.'s U.S. Pat. No. 7,775,044 issued Aug. 17, 2010, or as described in U.S. patent application Ser. Nos. 13/554,517 and 13/554,564 both filed Jul. 20, 2012, the entire contents of all of which are incorporated by reference herein. The compound cycle engine system may be used as a prime mover engine, such as on an aircraft or other vehicle, or in any other suitable application. In any event, in such a system, air is compressed by a compressor before entering the Wankel engine, and the engine drives one or more turbine(s) of the compound engine. In another embodiment, the rotary engine 10 is used with a turbocharger without being compounded; in another embodiment, the rotary engine 10 is used without a turbocharger, with air at atmospheric pressure, as a stand-alone engine. In one embodiment, the rotary engine 10 may be applicable to land base systems including, but not limited to, generators.

The engine 10 is shown and described herein as a Wankel engine as an example only. It is understood that the engine 10 may alternately be any other adequate type of internal combustion engine having a pilot subchamber for ignition, such as for example a reciprocating engine, or a rotary engine having a different configuration than that of a Wankel engine. For example, in a particular embodiment, the rotary engine may be a single or eccentric type rotary engine in which the rotor rotates about a fixed center of rotation. For example, the rotary engine may be a sliding vane engine, such as described in U.S. Pat. No. 5,524,587 issued Jun. 11, 1996 or in U.S. Pat. No. 5,522,356 issued Jun. 4, 1996, the entire contents of both of which are incorporated by reference herein. In another particular embodiment, the rotary engine may be an oscillatory rotating engine, including two or more rotors rotating at different angular velocities, causing the distance between portions of the rotors to vary and as such the chamber volume to change. In another particular embodiment, the rotary engine may be a planetary rotating engine having a different geometry than that of the Wankel engine, such as for example a planetary engine having a rotor cavity with an epitrochoid profile defining three lobes and a rotor with four apex portions. Examples of such non-Wankel rotary engines are shown in Applicant's U.S. application Ser. No. 13/750,523 filed Jan. 25, 2013, the entire contents of which is incorporated by reference herein. Other rotary engine geometries are also possible.

The engine 10 generally includes at least one moveable body received in a corresponding internal cavity of an outer body to define at least one combustion chamber. For example, the engine 10 may be a reciprocating engine with a plurality of internal cavities each receiving a moveable body in the form of a reciprocating piston. The engine 10 may alternately be a rotary engine with a plurality of internal cavities each receiving a moveable body on the form of a rotatable body or rotor.

Referring back to FIG. 1, in the particular embodiment shown, the engine 10 comprises an outer body 12 having at least one rotor cavity 20 (only one of which is shown) each defined by axially-spaced end walls 14 and a peripheral wall 18 extending therebetween, with a rotatable body or rotor 24 received in each cavity 20. The inner surface 19 of the peripheral wall 18 of each cavity 20 has a profile defining two lobes, which is preferably an epitrochoid.

In the case of a multiple rotor engine, the outer body 12 may be integral or defined by a plurality of body portions each defining a respective one of the cavities 20 and receiving a respective one of the rotors 24.

Each rotor 24 is received within the respective cavity 20, with the geometrical axis of the rotor 24 being offset from and parallel to the axis of the outer body 12. Each rotor 24 has axially spaced end faces 26 adjacent to the outer body end walls 14, and a peripheral face 28 extending therebetween. The peripheral face 28 defines three circumferentially-spaced apex portions 30 and a generally triangular profile with outwardly arched sides. The apex portions 30 are in sealing engagement with the inner surface of peripheral wall 18 to form three rotating working or combustion chambers 32 between the inner rotor 24 and outer body 12. A recess (not shown) is defined in the peripheral face 28 of the rotor 24 between each pair of adjacent apex portions 30, to form part of the corresponding chamber 32.

The combustion chambers 32 are sealed. Each rotor apex portion 30 has an apex seal 52 extending from one end face 26 to the other and protruding radially from the peripheral face 28. Each apex seal 52 is biased radially outwardly against the peripheral wall 18 through a respective spring. An end seal 54 engages each end of each apex seal 52, and is biased against the respective end wall 14 through a suitable spring. Each end face 26 of the rotor 24 has at least one arc-shaped face seal 60 running from each apex portion 30 to each adjacent apex portion 30, adjacent to but inwardly of the rotor periphery throughout its length. A spring urges each face seal 60 axially outwardly so that the face seal 60 projects axially away from the adjacent rotor end face 26 into sealing engagement with the adjacent end wall 14 of the cavity. Each face seal 60 is in sealing engagement with the end seal 54 adjacent each end thereof.

Although not shown, each rotor 24 is journaled on an eccentric portion of a shaft and includes a phasing gear co-axial with the rotor axis, which is meshed with a fixed stator phasing gear secured to the outer body co-axially with the shaft. In a particular embodiment where the engine 10 includes multiple rotors 24 and cavities 20, each rotor 24 may be journaled on a respective eccentric portion of a same shaft.

The shaft rotates each rotor 24 and the meshed gears guide the rotor 24 to perform orbital revolutions within the respective rotor cavity 20. The shaft rotates three times for each complete rotation of the rotor 24 as it moves around the rotor cavity 20. Oil seals are provided around the phasing gear to prevent leakage flow of lubricating oil radially outwardly thereof between the respective rotor end face 26 and outer body end wall 14.

For each rotor cavity 20, at least one inlet port 44 is defined through one of the end walls 14 or the peripheral wall 18 for admitting air (atmospheric or compressed) into one of the working chambers 32, and at least one exhaust port 46 is defined through one of the end walls 14 or the peripheral wall 18 for discharge of the exhaust gases from the combustion chambers 32. The inlet and exhaust ports 44, 46 are positioned relative to each other and relative to the ignition member and fuel injectors (further described below) such that during each rotation of the rotor 24, each chamber 32 moves around the cavity 20 with a variable volume to undergo the four phases of intake, compression, expansion and exhaust, these phases being similar to the strokes in a reciprocating-type internal combustion engine having a four-stroke cycle.

In a particular embodiment, the inlet and exhaust ports 44, 46 are arranged such that the rotary engine 10 operates under the principle of the Miller or Atkinson cycle, with its volumetric compression ratio lower than its volumetric expansion ratio. In another embodiment, the inlet and exhaust ports 44, 46 are arranged such that the volumetric compression and expansion ratios are equal or similar to one another.

The engine 10 includes a pilot subchamber 72 for each rotor cavity 20, defined in the outer body 12, for pilot fuel injection and ignition. In the embodiment shown, the pilot subchamber 72 is provided in an insert 34 received in a corresponding hole 36 defined through the peripheral wall 18 of the outer body 12. The insert 34 is retained to the peripheral wall 18 using any adequate type of connection, including, but not limited to, fasteners, welding, brazing, retention through a cover overlapping the insert 34 and connected to the peripheral wall 18, etc. In another embodiment, the pilot subchamber 72 is directly defined in the peripheral wall 18.

In the embodiment shown, the insert body 34 has the entire pilot subchamber 72 defined therein, shown here with a circular cross-section. Other geometries are also possible, including but not limited to cylindrical, conical, frustoconical, wedge-shaped profiles, etc. The insert 34 includes at least one outlet opening 74 defined therein for communication with the cavity 20, and the subchamber 72 has a shape forming a reduced cross-section adjacent the opening(s) 74, such that the opening(s) 74 define a restriction to the flow between the subchamber 72 and the cavity 20. The opening(s) 74 may have various shapes and/or be defined by a pattern of multiple holes.

The particular insert 34 shown is provided only as an example, and it is understood that other geometries and/or positions within the peripheral wall 18 are possible for the insert 34. In a particular embodiment, the insert 34 is made of a material having a greater high temperature properties and/or lower thermal conductivity than that of the peripheral wall 18, which may be for example made of aluminum. In one embodiment, the insert 34 is made of a nickel or cobalt based super alloy. Alternately, as mentioned above, the insert 34 may be omitted and the pilot subchamber 72 be directly defined in the peripheral wall 18 if the peripheral wall 18 is made of a material having sufficient heat resistance and adequate high temperature properties to resist the high temperatures within the subchamber 72.

The peripheral wall 18 of each rotor cavity 20 has a main injector elongated hole 40 defined therethrough, in communication with the rotor cavity 20 and spaced apart from the pilot subchamber 72. A main fuel injector 42 is received and retained within this corresponding hole 40, with the tip of the main injector 42 communicating with the cavity 20 at a point spaced apart from the pilot subchamber 72. The main injector 42 is located rearwardly of the pilot subchamber 72 with respect to the direction R of the rotor rotation and revolution, and is angled to direct fuel forwardly into each of the rotating chambers 32 sequentially with a tip hole pattern designed for an adequate spray.

The peripheral wall 18 of each rotor cavity 20 also has a pilot injector elongated hole 76 defined therethrough in communication with the subchamber 72. A pilot fuel injector 78 is received and retained within the corresponding hole 76, with the tip of the pilot injector 78 being in communication with the subchamber 72, for example by terminating in a corresponding opening defined in the insert 34 between the subchamber 72 and the pilot injector hole 76. It can be seen that the main injector 42 and pilot injector 78 are spaced apart from one another.

The pilot injector 78 and main injector 42 of each rotor cavity 20 inject fuel, which in a particular embodiment is heavy fuel e.g. diesel, kerosene (jet fuel), equivalent biofuel, etc. into the chambers 32. Alternately, the fuel may be any other adequate type of fuel suitable for injection as described, including non-heavy fuel such as for example gasoline or liquid hydrogen fuel. In a particular embodiment, at least 0.5% and up to 20% of the fuel is injected through the pilot injector 78, and the remainder is injected through the main injector 42. In another particular embodiment, at most 10% of the fuel is injected through the pilot injector 78. In another particular embodiment, at most 5% of the fuel is injected through the pilot injector 78. The main injector 42 injects the fuel such that each rotating chamber 32 when in the combustion phase contains a lean mixture of air and fuel.

The peripheral wall 18 of each rotor cavity 20 and, in the embodiment shown, the insert body 34 have an ignition element elongated hole 82 defined therein in communication with the subchamber 72. An igniter or ignition element 84 is received and retained within the corresponding hole 82 and positioned to ignite fuel within the subchamber 72, e.g. with the tip of the ignition element 84 being received in the subchamber 72. In the embodiment shown, the ignition element 84 is a glow plug. Other configurations are also possible, including for example having the ignition element 84 completely received within the insert 34, and/or ignition element(s) 84 of any other adequate type, including but not limited to plasma ignition, laser ignition, spark plug, microwave, other types of ignition elements, etc.

Referring to FIG. 2, in a particular embodiment, the main fuel injector(s) 42 and the pilot fuel injector(s) 78 of the engine 10 are in fluid communication with a same common rail 100. The common rail 100 has an inlet 108 in fluid communication with a pump system 106. In the embodiment shown, the pump system 106 includes a low pressure pump 110 located in or in fluid communication with a fuel source or fuel tank 112, and a high pressure pump 114 receiving the fuel from the low pressure pump 110 and feeding it to the inlet 108 of the common rail 100.

The common rail 100 has an outlet 116 in selective fluid communication, directly or indirectly, with the fuel tank 112 such as to return an excess of fuel thereto. In the embodiment shown, a metering or pressure regulating valve 118 is provided at the outlet 116 to regulate the flow of fuel therethrough. A pressure regulating mechanism regulates the fuel pressure in the common rail and may be provided in the pump system 106 (e.g. metering unit) and/or by the valve 118.

In the embodiment shown, an engine control unit 120 controls the pilot and main fuel injection through control of the high pressure pump 114 (e.g. actuation, fuel pressure and/or fuel flow), the valve 118 (e.g. position) and the fuel injectors 42, 78 (e.g. actuation of electronic valves controlling the injection pulses).

In a particular embodiment, the engine 10 has a single moveable body, with a single main injector 42 and a single pilot injector 78 in fluid communication with the common rail 100. In another embodiment, the engine 10 includes at least one additional moveable body, each having an additional main injector 42 and an additional pilot injector 78 (one being shown in dotted lines in FIG. 2) also in fluid communication with the same common rail 100.

In use, the fuel is combusted by pressurizing the fuel in the common rail 100, feeding the pilot injector(s) 78 with the common rail 100 to inject the fuel in the pilot subchamber(s) 72 where it is ignited and circulated into a respective combustion chamber 32, and feeding the main injector(s) 42 with the common rail 100 to inject the fuel into the combustion chamber 32. The pilot and main injections are thus performed spaced apart from one another.

In a particular embodiment, both the main and pilot injectors 42, 78 inject the fuel using the pressure provided in the common rail 100, e.g. without the use of pressure intensification mechanisms. In a particular embodiment, a difference in fuel volume between the pilot and main injections may be provided by tuning the duration and/or number of injection pulses and/or by using a pilot injector 78 having a smaller open area $A_p$, as defined by the tip openings through which the fuel is injected, than the open area $A_m$ of the main injector 42 (see FIG. 1).

In the embodiment shown in FIG. 3, the engine 10 includes multiple moveable bodies, and as such a plurality of main fuel injectors 42 and pilot fuel injectors 78 (three in the embodiment shown). All the main fuel injectors 42 are in fluid communication with a same common primary fuel conduit 202, while all the pilot fuel injectors 45 are in fluid communication with a same common secondary fuel conduit 204. A primary pressure regulating mechanism regulates the fuel pressure in the primary fuel conduit 202 while a secondary pressure regulating mechanism regulates a fuel pressure in the secondary conduit 204. The primary and secondary pressure regulating mechanisms are settable at different pressure values from one another such that the primary and secondary fuel conduits 202, 204 can provide fuel at different pressures.

In the particular embodiment shown, the primary and secondary conduits 202, 204 are separate chambers defined side by side in a same common rail 200. The inlet 208 of the common rail 200 and of the primary fuel conduit 202 is in fluid communication with a pump system 206 (e.g. single or multiple pump arrangement) providing for the primary pressure regulating mechanism (e.g. through a metering unit), by regulating the fuel flow from the pump system 206 to the primary conduit 202.

The primary and secondary conduits 202, 204 are in selective fluid communication with each other through a metering or pressure regulating valve 222 which is also in selective fluid communication with the fuel tank 112 such as to return an excess of fuel thereto. In a particular embodiment, the valve 222 is a metering valve. The secondary conduit 204 has an outlet 216 (also corresponding to the outlet of the common rail 200) in selective fluid communication, directly or indirectly, with the fuel tank 112 such as to return an excess of fuel thereto. In the embodiment shown, a second metering or pressure regulating valve 218 is provided at the outlet of the secondary conduit to regulate the flow of fuel therethrough. As such, in the embodiment shown, the pressure regulating mechanism of the secondary conduit 204 may be provided by the inlet valve 222 and/or the outlet valve 218.

In the embodiment shown, the engine control unit 120 controls the pilot and main fuel injection through control of the pump system 206 (e.g. actuation, fuel pressure and/or fuel flow), the valves 218, 222 (e.g. position) and the fuel injectors 42, 78 (e.g. actuation of electronic valves controlling the injection pulses).

In a particular embodiment, the different pressures of the main and pilot injection allows for main and pilot injectors 42, 78 having a similar size and configuration to be used while still obtaining a smaller fuel volume in the pilot injection than in the main injection. Alternately, as above, the pilot injector 78 may have a smaller open area, as defined by the tip openings through which the fuel is injected, than that of the main injector 42.

In use, the fuel is combusted by pressurizing the fuel in the primary and secondary conduits 202, 204 to obtain different fuel pressures, feeding the pilot injectors 78 with the primary conduit 202 to inject fuel in the respective pilot subchamber 72 where it is ignited and circulated into a respective combustion chamber 32, and feeding the main injectors 42 with the secondary conduit 204 to inject fuel into the combustion chamber 32.

Alternately, the primary conduit 202 may be connected to the main injectors 42 and the secondary conduit 204 may be connected to the pilot injectors 78.

The embodiment shown in FIG. 4 is similar to the embodiment shown in FIG. 3. However, in this embodiment, the primary and secondary conduits 302, 304 are respectively defined by separate common rails. A first pump system 306 (e.g. single or multiple pump arrangement) is in fluid communication with the fuel source and with the inlet 308 of the primary conduit. A second pump system 307 (e.g. single or multiple pump arrangement) is in fluid communication with the fuel tank 112 and with the inlet 309 of the secondary conduit 304.

Each conduit 302, 304 has an outlet 315, 316 in selective fluid communication, directly or indirectly, with the fuel tank 112 such as to return an excess of fuel thereto. In the embodiment shown, a metering or pressure regulating valve 322, 318 is provided at the outlet 315, 316 of each conduit 302, 304 to regulate the flow of fuel therethrough. The primary pressure regulating mechanism may thus provided in the first pump system 306 (e.g. metering unit) and/or by the first valve 322, while the secondary pressure regulating mechanism may be provided in the second pump system 307 (e.g. metering unit) and/or by the second valve 318.

In the embodiment shown, the engine control unit 120 controls the pilot and main fuel injection through control of the pump systems 306, 307 (e.g. actuation, fuel pressure and/or fuel flow), the valves 318, 322 (e.g. position) and the fuel injectors 42, 78 (e.g. actuation of electronic valves controlling the injection pulses). Alternately, the pump system and valve associated with each of the conduits may be controlled by a different engine control unit.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A method of combusting fuel in an internal combustion engine having a rotatable body defining at least one combustion chamber, the method comprising:
    pressurizing the fuel in a common rail;
    feeding a pilot injector with the common rail to inject fuel in a pilot subchamber;
    igniting the fuel within the pilot subchamber;
    circulating the ignited fuel out of the pilot subchamber and into one of the at least one combustion chamber; and
    feeding a main injector separate from the pilot injector with the common rail to inject fuel into the one of at least one combustion chamber spaced apart from the pilot subchamber and the pilot injector.

2. The method as defined in claim 1, wherein the internal combustion engine further comprises at least one additional rotatable body each defining at least one combustion chamber, the method further comprising, for each additional rotatable body:
    feeding a respective additional pilot injector with the common rail to inject fuel in a respective additional pilot subchamber;
    igniting the fuel within the respective additional pilot subchamber;
    circulating the ignited fuel out of the respective additional pilot subchamber and into one of the at least one combustion chamber defined by the additional rotatable body; and
    feeding a respective additional main injector separate from the respective additional pilot injector with the common rail to inject fuel into the one of at least one combustion chamber defined by the additional rotatable body spaced apart from the respective additional pilot subchamber and the respective additional pilot injector.

3. The method as defined in claim 1, wherein the fuel is heavy fuel.

4. The method as defined in claim 1, wherein pressurizing the fuel in the common rail includes regulating a fuel pressure in the common rail with an engine control unit.

5. The method as defined in claim 1, wherein injecting the fuel in the pilot subchamber and injecting the fuel into the one of at least one combustion chamber are performed at a same fuel pressure.

6. An internal combustion engine comprising:
    an outer body defining an internal cavity;
    a rotatable body sealingly and rotationally received within the internal cavity to define at least one combustion chamber of variable volume;
    a pilot subchamber defined in the outer body in communication with the internal cavity;
    a pilot fuel injector having a tip in communication with the pilot subchamber;
    an igniter positioned to ignite fuel within the pilot subchamber;
    a main fuel injector spaced apart from the pilot fuel injector and having a tip in communication with the internal cavity at a location spaced apart from the pilot subchamber;
    a common rail in fluid communication with the main fuel injector and with the pilot fuel injector; and
    a metering or pressure regulating valve in fluid communication with the common rail for regulating a fuel pressure therein.

7. The engine as defined in claim 6, wherein the metering or pressure regulating valve is provided at least in part in a pump in fluid communication with a fuel source and with an inlet of the common rail.

8. The engine as defined in claim 7, wherein a fuel outlet of the common rail is in selective fluid communication with the fuel source through the metering or pressure regulating valve.

9. The engine as defined in claim 8, wherein the valve is actuable by an engine control unit.

10. The engine as defined in claim 6, wherein the internal cavity is defined by two axially spaced apart end walls and a peripheral wall extending between the end walls, and the rotatable body is a rotor body rotatable within the internal cavity in sealing engagement with the peripheral and end walls.

11. The engine as defined in claim 10, wherein the internal cavity defines an epitrochoid shape with two lobes, the rotor body has three circumferentially spaced apex portions, and the at least one combustion chamber include three rotating chambers of variable volume, the rotor body being engaged to an eccentric portion of a shaft to rotate and perform orbital revolutions within the cavity with each of the apex portions remaining in sealing engagement with the peripheral wall and separating the chambers.

12. The engine as defined in claim 6, wherein the pilot injector and the main injector have tip openings through which the fuel is injected, and an open area defined by the tip openings of the pilot injector is smaller than that defined by the tip openings of the main injector.

13. The engine as defined in claim 6, wherein the engine includes at least one additional rotatable body sealingly and rotationally received within a respective additional internal cavity of the outer body to define at least one combustion chamber of variable volume, and further including, for each additional rotatable body, a respective additional pilot subchamber defined in the outer body in communication with the respective additional internal cavity, an additional pilot fuel injector having a tip in communication with the respective additional pilot subchamber, an additional igniter positioned to ignite fuel within the respective additional pilot subchamber, and an additional main fuel injector having a tip in communication with the respective additional internal cavity at a location spaced apart from the respective additional pilot subchamber, the common rail also being in fluid communication with the additional main fuel injector and with the additional pilot fuel injector of each additional rotatable body.

14. A rotary internal combustion engine comprising:
an outer body having an internal cavity defined by two axially spaced apart end walls and a peripheral wall extending between the end walls;
a rotor body rotatable within the internal cavity in sealing engagement with the peripheral and end walls and defining at least one chamber of variable volume in the internal cavity around the rotor body;
a pilot subchamber defined in the outer body in fluid communication with the internal cavity;
a pilot fuel injector having a tip in communication with the pilot subchamber;
an igniter positioned to ignite fuel within the pilot subchamber;
a main fuel injector spaced apart from the pilot fuel injector, the main fuel injector having a tip in communication with the internal cavity at a location spaced apart from the pilot subchamber;
a common rail in fluid communication with the main fuel injector and with the pilot fuel injector; and
a metering or pressure regulating valve in fluid communication with the common rail for regulating a fuel pressure therein.

15. The engine as defined in claim 14, wherein the internal cavity defines an epitrochoid shape with two lobes, the rotor body has three circumferentially spaced apex portions, and the at least one combustion chamber include three rotating chambers of variable volume, the rotor body being engaged to an eccentric portion of a shaft to rotate and perform orbital revolutions within the cavity with each of the apex portions remaining in sealing engagement with the peripheral wall and separating the chambers.

16. The engine as defined in claim 14, wherein the metering or pressure regulating valve is provided at least in part in a pump in fluid communication with a fuel source and with an inlet of the common rail.

17. The engine as defined in claim 16, wherein a fuel outlet of the common rail is in selective fluid communication with the fuel source through the metering or pressure regulating valve.

18. The engine as defined in claim 17, wherein the valve is actuable by an engine control unit.

19. The engine as defined in claim 14, wherein the pilot injector and the main injector have tip openings through which the fuel is injected, and an open area defined by the tip openings of the pilot injector is smaller than that defined by the tip openings of the main injector.

20. The engine as defined in claim 14, wherein the engine includes at least one additional rotor body engaged to a same shaft as the rotor body, the additional rotor body being in sealing engagement with peripheral and end walls of a respective additional internal cavity of the outer body to define at least one combustion chamber of variable volume, and further including, for each additional rotor body, a respective additional pilot subchamber defined in the outer body in communication with the respective additional internal cavity, an additional pilot fuel injector having a tip in communication with the respective additional pilot subchamber, an additional igniter positioned to ignite the fuel within the respective additional pilot subchamber, and an additional main fuel injector spaced apart from the additional pilot fuel injector and having a tip in communication with the respective additional cavity at a location spaced apart from the respective pilot subchamber, the common rail also being in fluid communication with the additional main fuel injector and with the additional pilot fuel injector of each additional rotor body.

\* \* \* \* \*